Patented Oct. 31, 1939

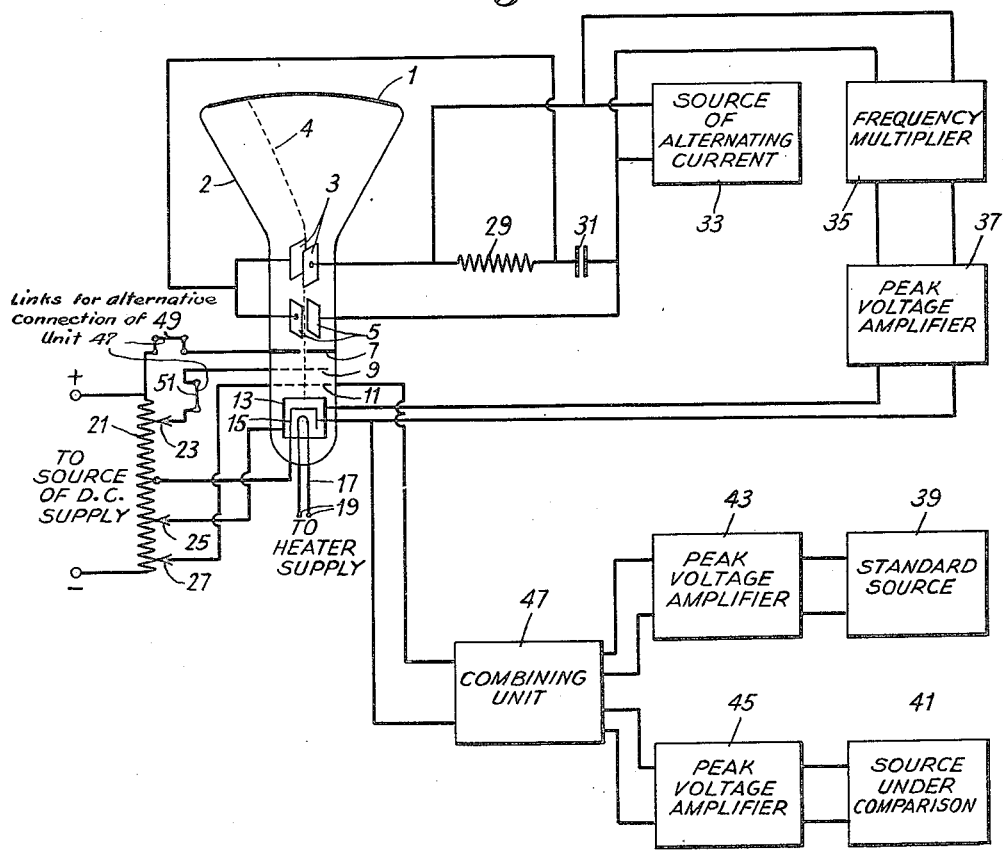
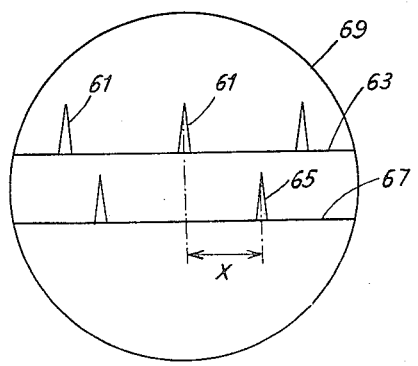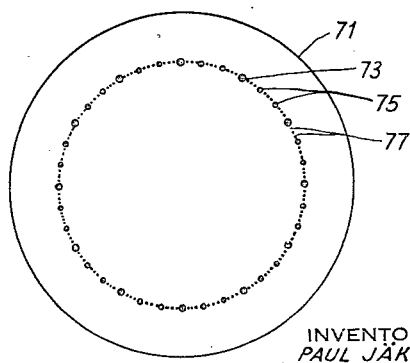

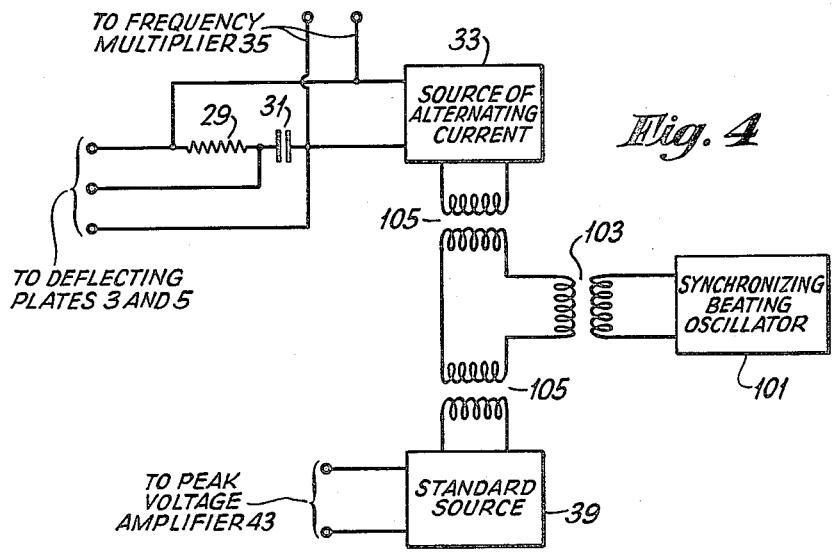
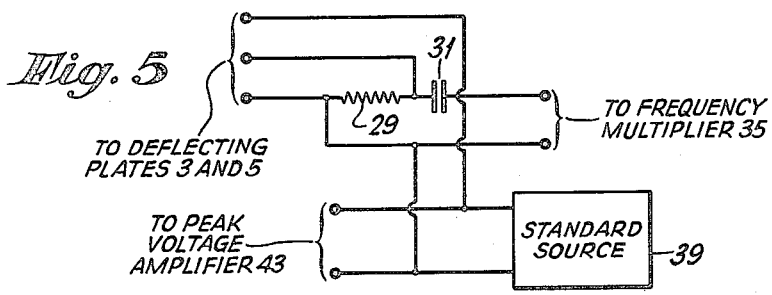
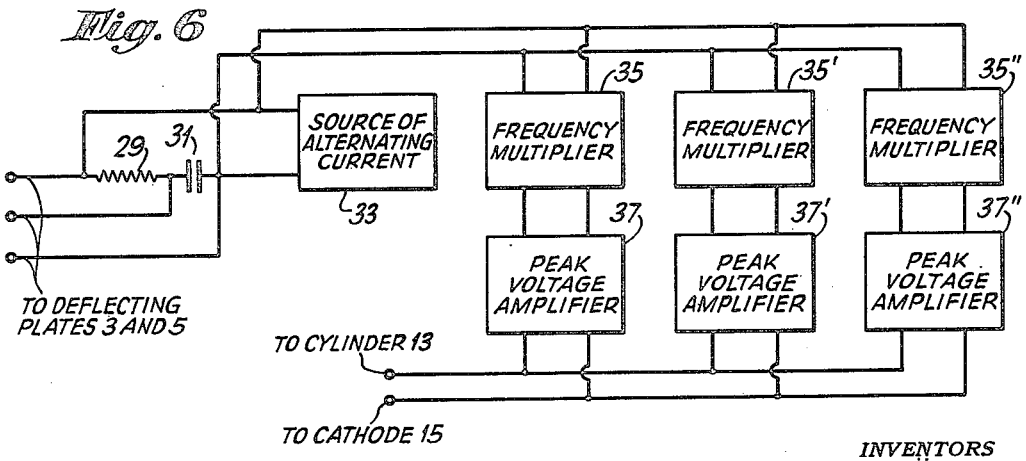

2,178,074

UNITED STATES PATENT OFFICE 2,178,074

ELECTRICAL MEASURING SYSTEM

Paul Jäkel and Herbert Muth, Berlin, Germany, assignors to Telefunken Gesellschaft für Drahtlose Telegraphie m. b. H., Berlin, Germany, a corporation of Germany Application October 9, 1936, Serial No. 104,909
In Germany August 27, 1935

4 Claims. (Cl. 172—245)

This invention relates to electrical measuring systems, and in particular, to phase measurement systems employing cathode ray tubes. In order to carry out phase displacement measurements of alternating currents by cathode ray tubes, the general procedure in the past has been such as to deflect a cathode ray in accordance with the standard source of voltage and the source of voltage whose phase is to be determined.

One such procedure consists in applying these voltages so as to deflect the ray in mutually perpendicular directions. The cathode ray is projected upon a luminescent screen generally mounted within the tube and in accordance with the movement of the ray, a light trace is produced. If the two voltages are in phase, a straight line, tilted at an angle of 45° results. If there is a 90° displacement between the voltages, a circle results provided the two voltage amplitudes are equal, which is a general operating condition. For intermediate values of phase angle between 0 and 90°, or from 90° to 180°, the pattern traced on the screen is an ellipse. By a suitable analysis of the pattern, the phase angle may be determined.

Alternatively it has been suggested to provide a commutating arrangement in conjunction with a linear deflecting system whereby the standard source of voltage and that of the voltage whose phase angle is to be determined are alterately commutated to produce deflection of the cathode ray, while the ray is being deflected in a mutually perpendicular direction by a linear voltage. Simultaneously with the commutation of the standard and unknown voltages is injected a small biasing voltage to shift the linear trace so that upon the screen of the cathode ray tube there are produced two traces, the horizontal displacement between the two voltage peaks being proportional to the phase angle.

Since in general it is difficult to determine accurately the position of the peaked value of a sinusoidal wave because of the flatness thereof, peak voltage amplifiers may be inserted between the commutating device and the two sources so that sharply peaked impulses are produced representative of the peak value only. This enables the measurements to be carried out with much greater accuracy.

However, a still further improvement may be made by utilizing a frequency which is equal to or a sub-multiple of the frequency of the standard source of voltage. By using this frequency in connection with a suitable phase shifting network, a circular trace may be provided on the luminescent screen. From this same frequency a frequency multiplier may be actuated and the resultant voltage applied to one of the control electrodes of the cathode ray gun structure so as to modulate the intensity of the cathode ray stream, and in particular, to reduce it to zero at peak values. Under such conditions there will result, instead of a solid circle, a dotted circle, and by suitable choice of frequency multiplication factor, for example, 360, there will appear around the trace of the circle, 360 dots equally spaced from each other. Obviously, therefore, the distance between successive dots represents 1°.

The standard source of voltage may then be either superimposed upon the same control electrode or impressed upon a second control electrode, and in said phase relation as to extinguish on its peak values, one or more of the points arranged circularly on the luminescent screen.

Having noted the blanked out points, the voltage whose phase angle is to be measured, is now impressed in the same phase relation as the standard source and upon the same electrode. Its peak values, therefore, will in general, extinguish another point, or other points of illumination, and by measuring the number of points intervening between the extinguished points produced both by the standard source and the voltage whose phase angle is to be measured, the phase angle is immediately determined. If it is desired, a plurality of related frequency multipliers may also be used with peaked voltage-amplifiers, the multiplication constant being chosen so as to have a value less than that used to provide the points arranged circularly, and utilizing these additional voltages to act upon the same control electrode as that which produces the circularly arranged points and in such phase relation as to increase the intensity of the cathode ray impinging upon the fluorescent screen. As a result an integral number of spots will have increased in intensity and serve to sub-divide the total number of points into smaller groups, for measuring or counting the total number of points which are indicative of the phase angle.

Accordingly, it is one of the objects of our invention to provide a new and improved electrical measuring system.

Another object of our invention is to provide improved procedure and means for measuring phase angles of electrical energy.

A still further object of our invention is to provide a new, novel and useful means of measuring phase angles of electrical currents by cathode ray tubes.

Another object of our invention is to provide a new and improved circuit for use with a cathode ray tube for measuring phase angles of electrical currents.

Other and ancillary objects of our invention will become clear upon reading the following description taken together with the drawings, in which:

Fig. 1 shows schematically one embodiment of our invention,

Figs. 2 and 3 are views illustrative of the means of measuring phase angles in accordance with our invention.

Figs. 4 and 5 show modifications of Fig. 1, in which Fig. 4 shows a means for interlocking the standard source of voltage with a source of alternating current, and Fig. 5 shows the means of supplying a circular sweep from a source of standard voltage, while Fig. 6 shows a further modification for providing a scale of different sized dots.

Referring now to the drawings, we will describe our invention in more detail.

In accordance with the first form of our invention which we have described, namely, the use of displaced linear sweep displacements of the cathode ray tube, as described in the paper entitled "The oscilloscope" by Bedell and Reich, which appeared in the Journal of the A. I. E. E., June 1927, pages 563–567 inclusive, upon which is superimposed a deflection at right angles to the sweep, and which is indicative of the currents to be compared. An image is formed on the end of the cathode ray tube, as shown in Fig. 2, in which 69 represents the flourescent screen of the cathode ray tube, 63 and 67 represent the linear traces due to a saw-tooth voltage generator acting in conjunction with suitable electrostatic or electromagnetic means for deflecting the ray, while the impulses 61 and 65 represent the impulses of the standard source 39 and the source under comparison 41 respectively after passing through the peak voltage amplifier. The horizontal distance X between the two peaks is proportional to the phase angle and can be translated into electrical degrees by the ratio of the distance between the peaks 61 and 65 and the successive peaks 61 multiplied by 360.

In accordance with our second form of invention, there is produced the circular trace of dots of various sizes shown in Fig. 3. In this figure, 71 represents the luminescent screen of the cathode ray tube. The fine dots 77 represent the breaking up of the circular trace into equi-distant positioned dots representative of the highest factor of frequency multiplication. In the representation shown, the distance between each of the dots represents two degrees, since there is a total of 180 dots. This means, of course, that the factor of multiplication used is 180.

Superimposed on this are medium sized dots 75 spaced a distance equal to 5 times the distance between the dots 77. The frequency multiplication factor of this, of course, will immediately be recognized as 36, the distance between two successive medium sized dots 75 and representing, therefore, 10°. Superimposed on the medium sized dots and spaced at intervals of threes are the large sized dots 73 of which there are 12, representing a factor of frequency multiplication of 12 and the distance between successive large dots being equal to 30°.

It will be appreciated, therefore, that when the standard source has its effect superimposed on the control of the intensity of the cathode ray beam so as to extinguish any one of the dots, there will appear a gap at the point during which this control takes place. When the unknown voltage which is to have its phase angle compared with that of the standard source, has its control exerted upon the cathode ray beam in general, another spot on the circle of luminescence will be extinguished, and consequently, merely counting the number of spots existing between the two points of extinction and multiplying in the case shown, by the factor of 2, will immediately give the phase angle in degrees.

In order to carry out this procedure of recording, the circuit shown in Fig. 1 may be used advantageously. In this figure a conventional cathode ray tube 2 is shown. Within the tube and at one end is mounted the luminescent screen 1. Two sets of deflecting plates 3 and 5 are interposed between the luminescent screen and the electron gun comprising the heater 17, the cathode 15, a Wehnalt cylinder 13, control grid 11, a first anode 9, and a second anode 7. It will be understood, of course, that other types of electron guns can be used for concentrating the electrons emitted from the cathode 15 into a narrow beam.

It will also be understood that an electromagnetic deflecting system may be used in place of the electrostatic deflection plates 3 and 5. Connected to the electrodes of the electron gun are various potentials which are derived from a voltage source in connection with a voltage divider 21. Suitable tapping points 23, 27 and 25 are provided to suitably control the potentials on the various electrodes to produce sharp focusing of the cathode ray beam 4 upon the screen 1. To produce the circular trace, a source 33 of alternating current of pure sine wave form is provided which is connected to the deflecting plate systems 3 and 5 with a phase shifting device interposed between the source and the deflecting plate system. In the drawings the simplest of phase shifting devices is shown comprising the resistor 29 and the condenser 31. The reactance of the condenser 31 is made numerically equal to the resistance of the resistor 29, and accordingly, by the connections shown to the plates across the plates 3 is impressed a voltage which is 90° out of phase with the voltage which is impressed across the plates 5.

As is well known, since these two voltages are equal, the resulting trace on the screen 1 is a circle. It is understood, of course, that any other suitable phase shifting device may be used instead of the simple resistor capacitor network shown.

Connected to the source of alternating current 33 is a frequency multiplier 35. The frequency multiplier may, for example, be a multi-vibrator whose natural period is approximately the desired multiple of the fundamental frequency of the source of alternating current, and which is synchronized and maintained at a constant frequency by voltage fed from the source of alternating current 33. Alternatively, frequency multipliers of the type used in radio transmission may be efficaciously used. The exact type of frequency multiplier used is unimportant and it may be determined by the suitability of any particular application. The output of the frequency multiplier, which has now a frequency which is generally an integral multiple of the source 33 is fed to a peak voltage amplifier 37. This amplifier may, for example, be simply a high biased amplifying stage, such that only the positive peaks of the output of the multiplier 35 are sufficient to produce output from the amplifier. It should be understood, however, that any of the well known peak voltage amplifiers may be used. The output of the amplifier 37 is then fed to the cathode 15 and the Wehnalt cylinder 13. The Wehnalt cylinder 13 is biased normally by the tap 25 on the voltage divider 7ᴬ and serves to focus the beam of electrons, and in turn, control their intensity. The voltage fed from the peak amplifier 37 is fed in such a phase, for example, as to suppress the luminescent effects on the screen 1 by the cathode ray 4. Accordingly, therefore, as the beam force swings around in its circular trace on the screen 1, the beam is alternately turned off and on by the voltage fed from the amplifier 37 and serves to produce the points 77 shown in Fig. 3.

Thus there is produced what amounts to a circular scale on the luminescent screen 1. In order to effect the measurement, the standard source of voltage 39, which is generally related to the source of alternating current 33 by an integral multiple or sub-multiple, is fed through a peak voltage amplifier 43, similar to the peak voltage amplifier 37. The output of this amplifier 43 is then fed to a combining unit 47 which in turn is connected between the cathode 15 and the control grid 11. The control grid 11 is suitably biased by the tap 27 on the voltage divider 21. The peaks passed on through the combining unit to this control grid are fed in such phase as to suppress the cathode ray beam, and accordingly, wherever the beam is suppressed during intervals which would normally luminesce, a gap will occur in the circular trace of dots produced on the screen 1. These gaps are suitably noted by the observer making the measurements. Then the source under comparison 41 is fed through a peak voltage amplifier 45 which may be similar to that used for peaking the frequency multiplier, and the standard source, and this is fed into the combining unit and impressed upon the grid 11. This voltage is fed in such a phase relation as to also suppress the beam 4, and accordingly, in general, i. e., when the phase angle is different from 0, two of the dots in the circular trace will be suppressed. By noting the gap between the two suppressed spots of illumination, the phase angle may be determined. The combining unit 47 can be any one of the arrangements for combining two voltages so as not to reflect any deleterious effects back upon the sources, and may, for example, be of the nature of a high grid coil known in the telephonic art, or a suitable filter network, for example, the particular type used being unimportant so long as the outputs of the amplifiers 43 and 45 do not act upon one another.

Alternatively, it is possible to take the output of the combining unit 47 and connect it in series with one of the anode potentials, such as, for example, at the point 49 of the second electrode or the point 51 of the first anode as described by D. W. Dye in a paper entitled "Improved cathode ray tube method for the harmonic comparison of frequency" which appeared in the Proceedings of the Physical Society, volume 37, page 158, 1925, London. It will be understood that in this case the output of the combining unit 47 is connected in series with the leads running from the voltage divider 21 to the appropriate electrode by breaking the connection at the point 49 or 51. In this case suppression of the circular trace of points is not produced, but instead, by suitably phasing the output of the combined unit 47 with the potential supplied to the electrode, the anode voltage may be increased in accordance with the voltage derived from the combining unit. It is well known that with increased anode voltage the deflection of the cathode ray beam is reduced, and accordingly, under the influence of the output of the combining unit 47, there will be produced on the luminescent screen 1 short luminescent dashes along a radial line from the points toward the center of the circle about which the plurality of luminescent points is positioned. The phase angle may thus be measured by measuring the distance between these radial lines.

Where it is desired to lock or synchronize the frequencies of the standard source 39 and the source of alternating current 33, a suitable synchronizing circuit may be connected between these two sources as shown in part in Fig. 4 and may take the form simply of a locking circuit in which the two sources are coupled together to provide an interchange of energy. One example of such a circuit is shown in Fig. 1 and described on page 2, lines 20-41 inclusive of United States Patent No. 2,028,805 to R. H. Ranger, issued January 28, 1936, and entitled "Multiplex transmission." Alternatively the source 33 may be eliminated entirely and the voltage impressed across the serially connected resistor 29 and the condenser 31 as shown in Fig. 5, may be derived from the standard source 39 after the fashion shown in United States Patent No. 1,951,533 to F. Schroter, issued March 20, 1934, and entitled "Television apparatus" wherein the same source of voltage serves to control the intensity of a beam of electrons, as well as the deflection of the beam of electrons. These modifications may be desirable for certain applications.

To produce different sized spots indicative of different phase angle displacements upon the scale as shown in Fig. 3 by the spots 73 and 75, additional frequency multipliers 35 and peak voltage amplifiers 37 may be connected to the source of alternating current 33 and the output of the amplifiers connected in parallel with that of the amplifier 37 as shown in Fig. 6, or, if it is desired, a combining unit may be utilized which would be connected between the Wehnalt cylinder and the plurality of peak voltage amplifiers for the same purpose as the combining unit 47 is used.

It should be understood in this case that the frequency multipliers would have different frequency multiplication factors and that the phase in which these outputs would be fed, would be in anti-phase relation to that of the peak voltage amplifier 37 and of different magnitudes so as to produce more brilliantly illuminated spots on the peak values of these additional voltages.

Having now described our invention, what we claim is:

1. In combination, a cathode ray tube comprising an electron gun having a plurality of electrodes and a cathode, and two mutually perpendicular cathode ray deflecting systems, a source of alternating current, a phase splitting network, connections from the source of alternating current to the phase splitting network, connections from the phase splitting network to the cathode ray deflecting systems, a frequency multiplier connected to the said source of alternating current, a peak voltage amplifier connected to the frequency multiplier, said peak voltage amplifier having an output circuit, said output circuit being connected to one of the aforesaid plurality of electrodes of the electron gun, a combining unit connected to a different electrode of the aforesaid plurality of electrodes, a reference source of voltage and a source of voltage to be measured, and peak voltage amplifiers connected respectively between the standard source and the combining unit and between the source to be measured and the combining unit.

2. A circuit for measuring the phase angle between a reference voltage and another voltage which comprises means for segregating the peak values only of both of said voltages, means for producing luminescent effects on a viewing plane in accordance with the segregated peak values of the voltages, and means for positioning the produced luminescent effects on the viewing plane in accordance with the segregated peak values of both of said voltages.

3. A circuit for measuring the phase angle between a reference voltage and another voltage which comprises means for producing a plurality of luminescent spots arranged in a circle upon a viewing plane, means for deriving energy from both of the voltages representative of the peak values only thereof, and means for suppressing certain of the produced luminescent spots in accordance with the derived energies, whereby the positions of the suppressed luminescent spots on the viewing plane indicate the phase angle between the voltages.

4. A circuit for measuring the phase angle between a reference voltage and another voltage which comprises means for producing a plurality of luminescent spots of non-uniform intensity arranged in a circle upon a viewing plane, means for deriving energy from both of the voltages representative of the peak values only thereof, and means for suppressing certain of the produced luminescent spots in accordance with the derived energies, whereby the positions of the suppressed luminescent spots on the viewing plane indicate the phase angle between the voltages.

PAUL JÄKEL.
HERBERT MUTH.